United States Patent

Tajima

[19]

[11] Patent Number: 6,108,149
[45] Date of Patent: *Aug. 22, 2000

[54] DIGITAL DATA TRANSMITTING APPARATUS FOR TRANSMITTING PARTIAL RESPONSE SIGNALS

[75] Inventor: Hiroshi Tajima, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,545

[22] PCT Filed: Feb. 9, 1996

[86] PCT No.: PCT/JP96/00280

§ 371 Date: Feb. 19, 1997

§ 102(e) Date: Feb. 19, 1997

[87] PCT Pub. No.: WO96/24933

PCT Pub. Date: Aug. 15, 1996

[30] Foreign Application Priority Data

Feb. 10, 1995 [JP] Japan .................................. 7-046135

[51] Int. Cl.[7] .................................................... G11B 5/09
[52] U.S. Cl. .................................. 360/40; 360/46; 341/58
[58] Field of Search ................................ 360/40, 41, 46; 341/58, 68, 69

[56] References Cited

U.S. PATENT DOCUMENTS

| | | | |
|---|---|---|---|
| 4,988,999 | 1/1991 | Uehara et al. | 341/59 |
| 5,161,171 | 11/1992 | Suzuki et al. | 360/32 |
| 5,198,813 | 3/1993 | Isozaki | 360/40 |
| 5,644,307 | 7/1997 | Fukuda | 341/68 |
| 5,699,061 | 12/1997 | Shimpuku | 360/48 |

*Primary Examiner*—Aristotelis M. Psitos
*Assistant Examiner*—Regina Y. Neal
*Attorney, Agent, or Firm*—Frommer Lawrence & Haug, LLP.; William S. Frommer

[57] ABSTRACT

A clock signal is easily extracted from a signal transmitted corresponding to a partial response transmission method so as to securely identify bits.

As a structure of a recording side, an 8-to-9 converting circuit is connected in series with a pre-coding circuit and a recording amplifier. An output signal of the recording amplifier is recorded on a magnetic tape. A signal reproduced from the magnetic tape is supplied to a reproducing amplifier. On a reproducing side, the reproducing amplifier is connected to a partial response equalizing and Viterbi decoding circuit and a clock extracting circuit. The clock extracting circuit is connected to the partial response equalizing and Viterbi decoding circuit.

20 Claims, 11 Drawing Sheets

Fig. 8
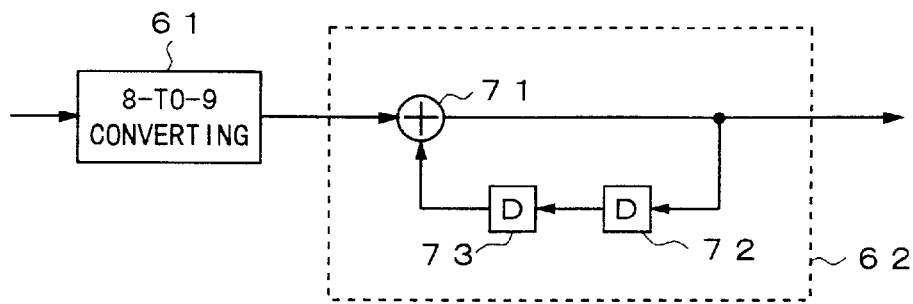
Fig. 9
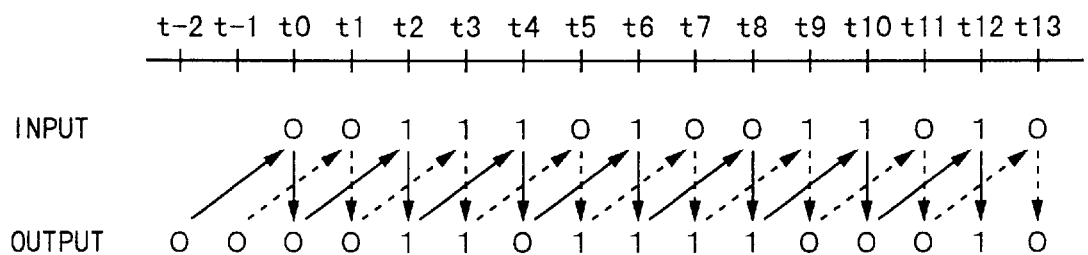
Fig. 10
| INPUT DATA | | 0 0 1 1 1 0 1 0 0 1 1 0 1 0 |
|---|---|---|
| OUTPUT DATA 1 | 0 0 | 0 0 1 1 0 1 1 1 1 0 0 0 1 0 |
| OUTPUT DATA 2 | 0 1 | 0 1 1 0 0 0 1 0 1 1 0 1 1 1 |
| OUTPUT DATA 3 | 1 0 | 1 0 0 1 1 1 0 1 0 0 1 0 0 0 |
| OUTPUT DATA 4 | 1 1 | 1 1 0 0 1 0 0 0 0 1 1 1 0 1 |

Fig. 12

| INPUT | PRE-CODE OUTPUT | | | | | | | |
|---|---|---|---|---|---|---|---|---|
| 000000000 | 00 | 000000000 | 01 | 010101010 | 10 | 101010101 | 11 | 111111111 |
| 000000001 | 00 | 000000001 | 01 | 010101011 | 10 | 101010100 | 11 | 111111110 |
| 000000010 | 00 | 000000010 | 01 | 010101000 | 10 | 101010111 | 11 | 111111101 |
| 000000011 | 00 | 000000011 | 01 | 010101001 | 10 | 101010110 | 11 | 111111100 |
| 000000100 | 00 | 000000101 | 01 | 010101111 | 10 | 101010000 | 11 | 111111010 |
| 000000101 | 00 | 000000100 | 01 | 010101110 | 10 | 101010001 | 11 | 111111011 |
| 111111110 | 00 | 110011000 | 01 | 100110010 | 10 | 011001101 | 11 | 001100111 |
| 111111111 | 00 | 110011001 | 01 | 100110011 | 10 | 011001100 | 11 | 001100110 |

Fig. 13A

```
00: 0000XXXXX      11: 1111XXXXX
X0: 00000XXXX      X1: 11111XXXX
XX: 000000XXX      XX: 111111XXX
XX: X000000XX      XX: X111111XX
XX: XX000000X      XX: XX111111X
XX: XXX000000      XX: XXX111111
```

Fig. 13B

```
00: 000XXXXXX      11: 111XXXXXX
XX: XXXXX0000      XX: XXXXX1111
```

CLOCK EXTRACTING CIRCUIT 109

DIGITAL DATA TRANSMITTING APPARATUS FOR TRANSMITTING PARTIAL RESPONSE SIGNALS

TECHNICAL FIELD

The present invention relates to an apparatus for sending digital data corresponding to a partial response method, for example, a data recorder for recording/ reproducing digital data on/from a magnetic tape with a head.

BACKGROUND ART

A data recorder has been widely used as an external storing unit for computers and the like. As an example of the data recorder, a helical scan type data recorder that records digital data on a cassette tape as a magnetic tape with a rotating head is known. In an example of the data recorder, a magnetic recording/reproducing system of the data recorder is treated as a transmitting system corresponding to a partial response method. The recording system precodes record data. The reproducing system equalizes a signal reproduced from the head corresponding to the partial response method and identifies bits corresponding to a clock signal extracted from the signal reproduced from the head so as to reproduce data. In this method, high density data can be reproduced without errors.

FIG. 15 is a block diagram showing a recording/reproducing system of a data recorder corresponding to the partial response transmission method.

Eight-bit-word data is input. The input data has been pre-processed by an error-correction-code encoding process. In addition, a block synchronous signal has been added to the input data. The input data is supplied to an 8-to-9 converting circuit 101. The 8-to-9 converting circuit 11 converts the input data into nine-bit-word data. The resultant data is supplied as serial data to a pre-coding circuit 102. In this data recorder, the magnetic recording/reproducing system is treated as a transmitting system corresponding to a partial response (1, 0, −1) method that is known as class 4 (hereinafter, this method is referred to as PR4 method). The pre-coding circuit 102 pre-codes the input serial data into a code corresponding to the PR4 transmission method. The resultant code is the same as well known interleaved NRZI code. The pre-coded data is recorded on a magnetic tape 105 through a recording amplifier 103 and a rotating recording head 104.

The data recorded on the magnetic tape 105 is reproduced by a rotating reproducing head 106 as a reproduced data signal. The reproduced data signal is supplied to a partial response circuit 108 and a clock signal extracting circuit 109 through a reproducing amplifier 107. The reproducing amplifier 107 has a pre-filter and a cosine equalizer (not shown) that compensate the phase and frequency characteristic of the reproduced data signal so as that the frequency characteristic of the data signal reproduced from the rotating reproducing head 106 satisfies a Nyquist frequency condition. The clock signal extracting circuit 109 extracts a clock signal from the data signal reproduced from the reproducing amplifier 107. The extracted clock signal is supplied to a partial response circuit 108. The partial response circuit 108 equalizes the supplied reproduced data signal corresponding to the PR4 method, identifies bits of the equalized reproduced data signal corresponding to the clock signal supplied from the clock signal extracting circuit 109, and restores the reproduced data signal to serial data that has not been pre-coded. The restored serial data is supplied to an 8-to-9 reverse converting circuit 110. The 8-to-9 reverse converting circuit 110 converts nine-bit-word data into eight-bit-word data. Thus, the input data is restored.

In the above-described data recorder, a clock signal is extracted from the reproduced data signal. Bits are identified corresponding to the clock signal. In the clock signal extracting method, with the phased lock loop (PLL) method of which the reversing state of the polarity of the reproduced data signal is detected and the detected reversing state is used as a phase reference, a voltage control oscillator (VCO) is controlled so as to obtain a clock signal that synchronizes with the reversing state of the polarity of the reproduced data signal. FIG. 16 shows an example of the clock signal extracting circuit 109.

The clock signal extracting circuit 109 operates as follows. A reproduced data signal is supplied to an integrating circuit 91. Since the waveform of the reproduced data signal has a differential characteristic corresponding to the magnetic recording/reproducing system. The integrating circuit 91 shapes the waveform of the reproduced data signal so that the level thereof can be properly detected in the next stage. A level comparing circuit 92 digitizes the reproduced data signal that has been waveform-shaped. A phase comparing circuit 93 compares the phase of the output signal of the level comparing circuit 92 and the phase of the output signal of a voltage control oscillator 94 and controls the oscillation frequency of the voltage control oscillator 94 with an error signal obtained as the result of the comparison so that the oscillation frequency of the voltage control oscillator 94 synchronizes with the output signal of the level comparing circuit 93. Thus, the voltage control oscillator 94 outputs a clock signal that synchronizes with the reversing state of the polarity of the reproduced data signal.

However, when the clock signal extracting circuit is structured as described above, as the polarity of the reproduced data signal frequently reverses (namely, the reversing intervals of the signal polarity are short), the phase comparing operation for comparing the phase of the output signal of the level comparing circuit 92 and the phase of the output signal of the voltage control oscillator 94 increases in a predetermined time unit. Thus, the clock signal that accurately synchronizes with the reversing state of the polarity of the reproduced data signal can be effectively obtained. When the clock signal that accurately synchronizes with the reversing state of the polarity of the reproduced data signal can be obtained, bits can be accurately identified.

However, in the data recorder structured in such a manner that the recording/reproducing system is treated as a transmitting system corresponding to the partial response method, there are following problems with respect to extracting clock signal and identifying bits.

(1) Since the reversing intervals of the polarity of the data code obtained by the pre-coding circuit 102 (for example, an interleaved NRZI code) are not controlled, when the reversing intervals become very long, the reproducing system may not accurately extract the clock signal.

(2) When the clock signal cannot be accurately extracted, bits cannot be accurately identified. Thus, data cannot be correctly reproduced.

To solve such problems, in the above-described data recorder, a scrambling process and a randomizing process are performed for data to be recorded so as to artificially shorten the reversing intervals of the signal polarity.

Although the method for shortening the reversing intervals of the signal polarity as in the scrambling process and randomizing process is effective for a video signal or the like that has a correlation between adjacent data, this method is not effectively for a signal that does not have a correlation between adjacent data.

DISCLOSURE OF THE INVENTION

Therefore, the present invention is made from the above described points of views as in the above-described problems (1) and (2). An object of the present invention is to provide a digital data transmitting apparatus that can accurately extract the clock signal on the receiving side and accurately identify bits and accurately identify bits so as to transmit data that does not have a correlation to a transmitting system corresponding to the partial response method.

The present invention is a digital data transmitting apparatus for transmitting digital data corresponding to a partial response method, the apparatus comprising a data converting means for converting input data of which one word is composed of m bits (where m is an integer) into conversion data of which one word is composed of n bits (where n is an integer that satisfies the relation of n>m) so that when the conversion data is pre-coded corresponding to the partial response method, the reversing intervals of the signal polarity of the conversion data become a predetermined value or less, a pre-coding means for pre-coding the conversion data corresponding to the partial response method, and a transmitting means for transmitting an output of said pre-coding means to a receiving side.

The present invention is a digital data transmitting apparatus for transmitting digital data corresponding to a partial response method, the apparatus comprising a data converting means for converting input data of which one word is composed of m bits (where m is an integer) into conversion data of which one word is composed of n bits (where n is an integer that satisfies the relation of n>m) so that when the conversion data is pre-coded corresponding to the partial response method, the reversing intervals of the signal polarity of the conversion data become a predetermined value or less, a pre-coding means for pre-coding the conversion data corresponding to the partial response method, and a recording means for recording an output of said pre-coding means to a record medium.

The data converting means according to the present invention converts data of which one word is composed of m bits (m-bit-word data) into data of which one word is composed of n bits (n-bit-word data) and supplies the converted data to a pre-coding means on the next stage so that the reversing intervals of the signal polarity of the converted data become a predetermined value or less or a DC component of the converted data becomes a predetermined value or less. The pre-coding means pre-codes the output signal of the data converting means and supplies the resultant signal to the transmitting means. The transmitting means outputs data of which the reversing intervals of the signal polarity thereof become the predetermined value or less or the DC component thereof becomes the predetermined value or less.

In addition, the data converting means according to the present invention converts m-bit-word data into n-bit-word data and supplies the converted data to the pre-coding means on the next stage so that the reversing intervals of the signal polarity of the converted data become a predetermined value or a DC component thereof becomes a predetermined value or less. The pre-coding means pre-codes the output signal of the data converting means and supplies the resultant signal to the recording means. The recording means records data of which the reversing intervals of the signal polarity thereof become the predetermined value or less or the DC component thereof becomes the predetermined value or less to the record medium.

BRIEF DESCRIPTION OF DRAWINGS

FIG. 8 is a block diagram showing the detail of a pre-coding circuit;

FIG. 9 is a schematic diagram showing bit calculated values of output data against input data;

FIG. 10 is a schematic diagram showing four codes of output data generated with input data and output data of two bits prior;

FIG. 12 is a schematic diagram showing 512 codes of output data;

FIGS. 13A and 13B are schematic diagrams showing data of which the same polarity successively lasts for 6T or more;

BEST MODES FOR CARRYING OUT THE INVENTION

Figure 1:
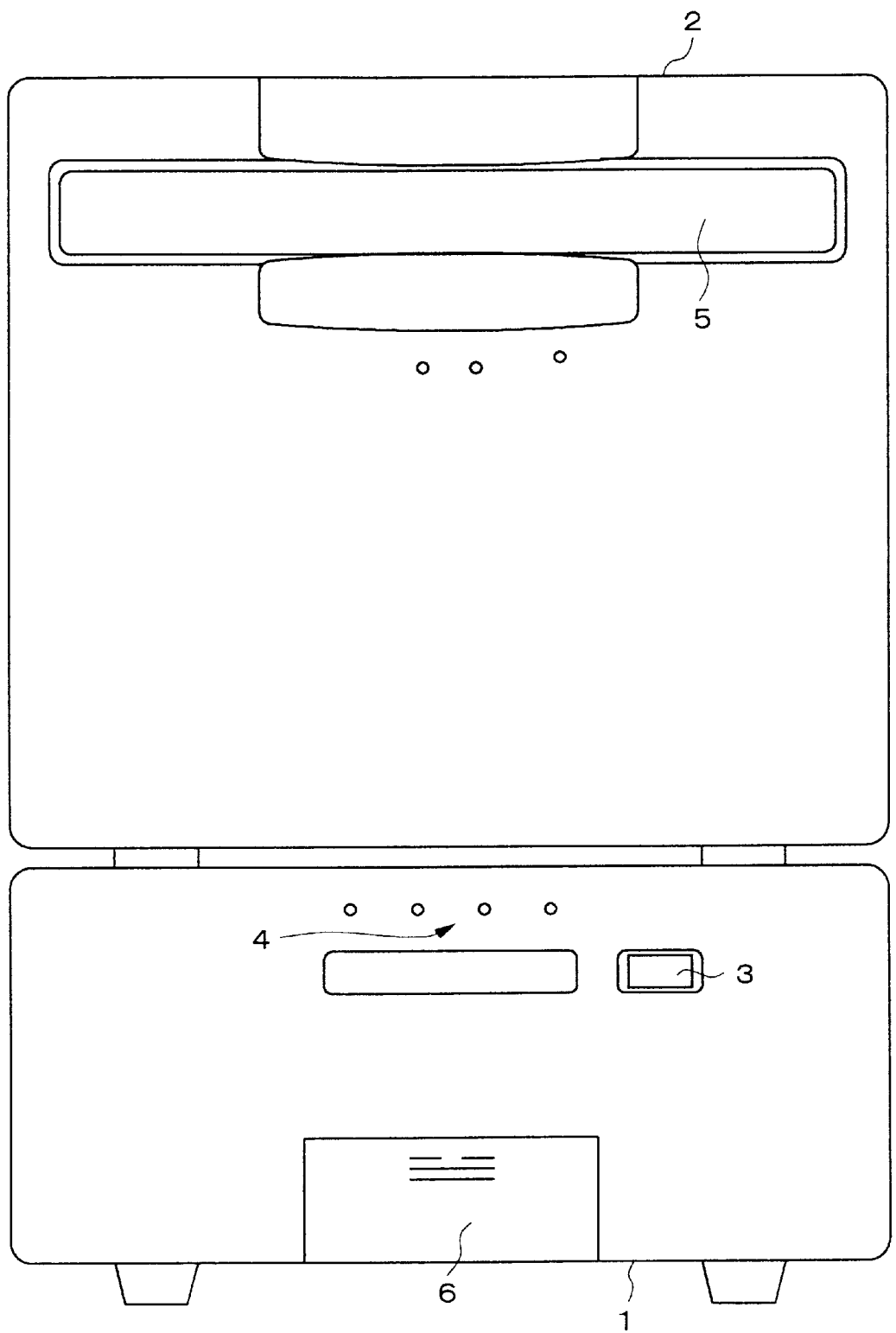
FIG. 1 is a front view showing a data recorder.
Figure 2:
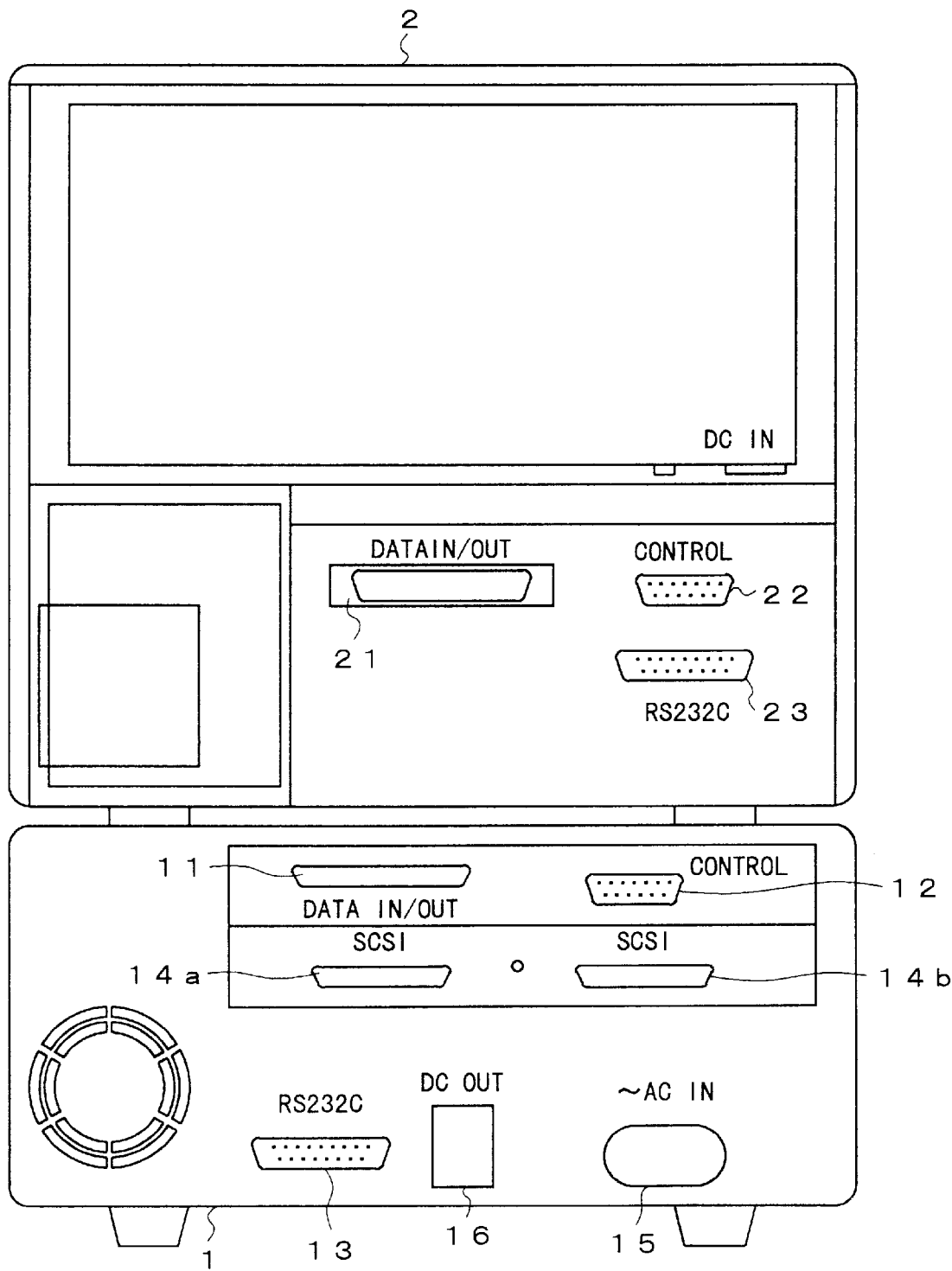
FIG. 2 is a rear view showing the data is recorder.

Next, with reference to the accompanying drawings, a data recorder according to the present invention will be described. The data recorder records/reproduces digital data on/from a cassette tape with a rotating head. FIG. 1 is a front view showing the data recorder. FIG. 2 is a rear view showing the data recorder.

As shown in FIG. 1, the data recorder is composed of an upper unit and a lower unit that are a tape drive controller 1 and a digital information recorder 2. A button that is used for loading/unloading the cassette tape and a plurality of light emitting diodes 4 that display a cassette tape loading state, a power ON state, and so forth are disposed on the front panel of the tape drive controller 1. In addition, other buttons are disposed inside a closable panel 6. A cassette tape loading opening 5 is disposed on the front panel of the digital information recorder 2.

As shown in FIG. 2, a plurality of connectors are disposed on the rear surfaces of the tape drive controller 1 and the digital information recorder 2. The tape drive controller 1 as the lower unit has a tape input/output connector 11, a control connector 12, an RS232C connector 13, two SCSI connectors 14a and 14b, an AC power input connector 15, and a DC power output connector 16.

On the other hand, the digital information recorder 2 has a data input/output connector 21, a control connector 22, and an RS232C connector 23. By connecting a predetermined connection cable of the digital information recorder 2 to the DC power output connector 16 of the tape drive controller 1, the DC power of the tape drive controller 1 is supplied to the digital information recorder 2. The data input/output connectors 11 and 21 are connected with a predetermined cable. Thus, data is exchanged between the controller 1 and the recorder 2. The control connectors 12 and 22 are connected with a predetermined cable. Thus, control signals are exchanged between the controller 1 and the recorder 2. The RS-232C connectors 13 and 23 are used for diagnosing the controller 1 and the recorder 2, respectively.

Figure 3:
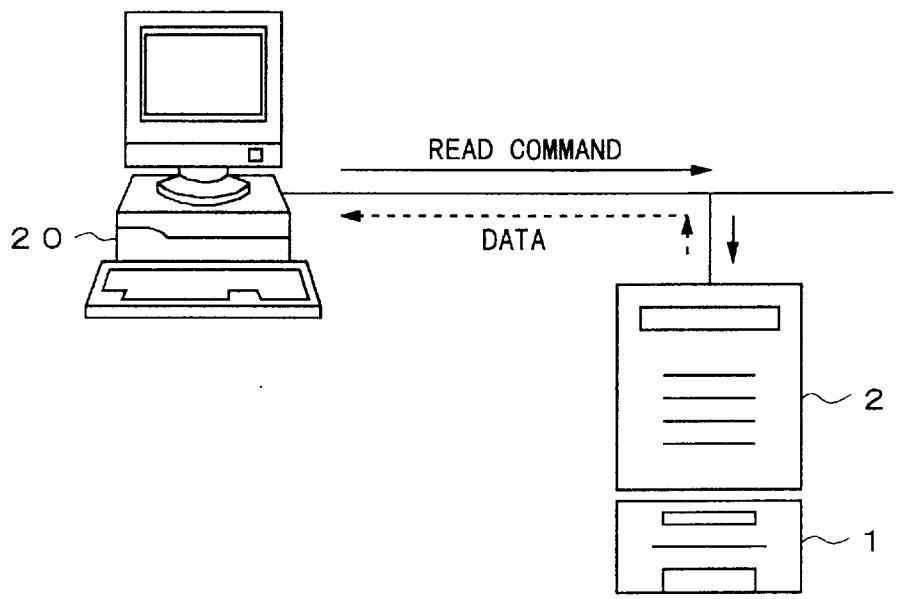
FIG. 3 is a schematic diagram showing an example of the use of the data recorder.
Figure 4:
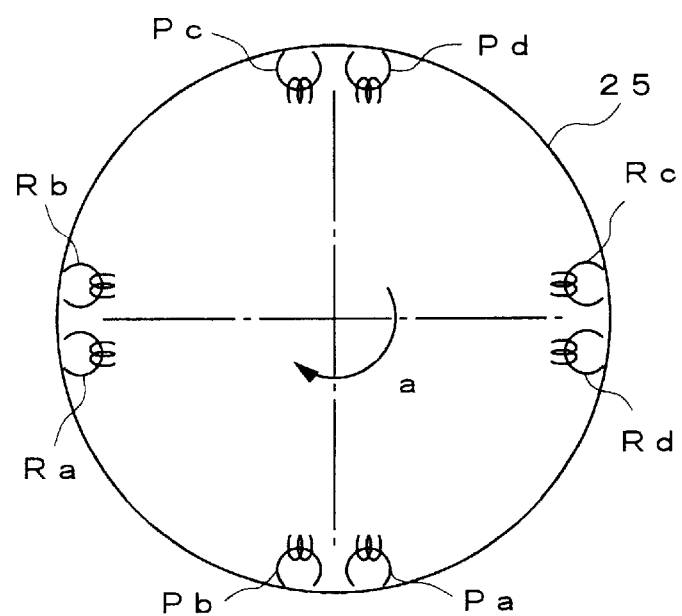
FIG. 4 is a schematic diagram showing positions of heads of the data recorder.

When the data recorder is connected to a host computer, the SCSI connectors 14a and 14b are used. As shown in FIG. 3, when a read command is sent from the host computer 20 to the data recorder, the data recorder outputs data to the host computer 20. The digital information recorder 2 records/reproduces digital data on/from a cassette tape with a rotating head. FIG. 4 shows an example of the positions of heads of the recorder 2. In FIG. 4, four recording heads Ra, Rb, Rc, and Rd and four reproducing (playback) heads Pa, Pb, Pc, and Pd are disposed on a drum that rotates at a predetermined speed.

The heads Ra and Rb are disposed at adjacent positions. Likewise, pairs of the heads Rc and Rd, the heads Pa and Pb, and the heads Pc and Pd are disposed at respective adjacent positions. The extended direction of the gap of one pair member is different from the extended direction of the gap of the other pair member (this extended direction is referred to as azimuth). The heads Ra and Rc oppositely disposed at an interval of 180° each have a first azimuth. The heads Rb and Rd oppositely disposed at an interval of 180° each have a second azimuth. The heads Pa and Pc oppositely disposed at an interval of 180° each have a first azimuth. The heads Pb and Pd oppositely disposed at an interval of 180° each have a second azimuth. With the different azimuths, a crosstalk between adjacent tracks can be prevented. Each pair of two adjacent heads is actually accomplished as an integrated head referred to as a double-azimuth head.

A tape (for example ½ inch-width tape) pulled out from the cassette is wound on the peripheral surface of the drum 25 at an angle of 180° or more. The tape is fed at a predetermined speed. Thus, when a signal is recorded on the tape, at the first half period of one rotation of the drum 25, the heads Ra and Rb scan the tape. At the second half period of the rotation, the heads Rc and Rd scan the tape. When a signal is reproduced from the tape, at the first half period of one rotation of the drum 25, the heads Pa and Pb scan the tape. At the second half period of the rotation, the heads Pc and Pd scan the tape.

Figure 5:
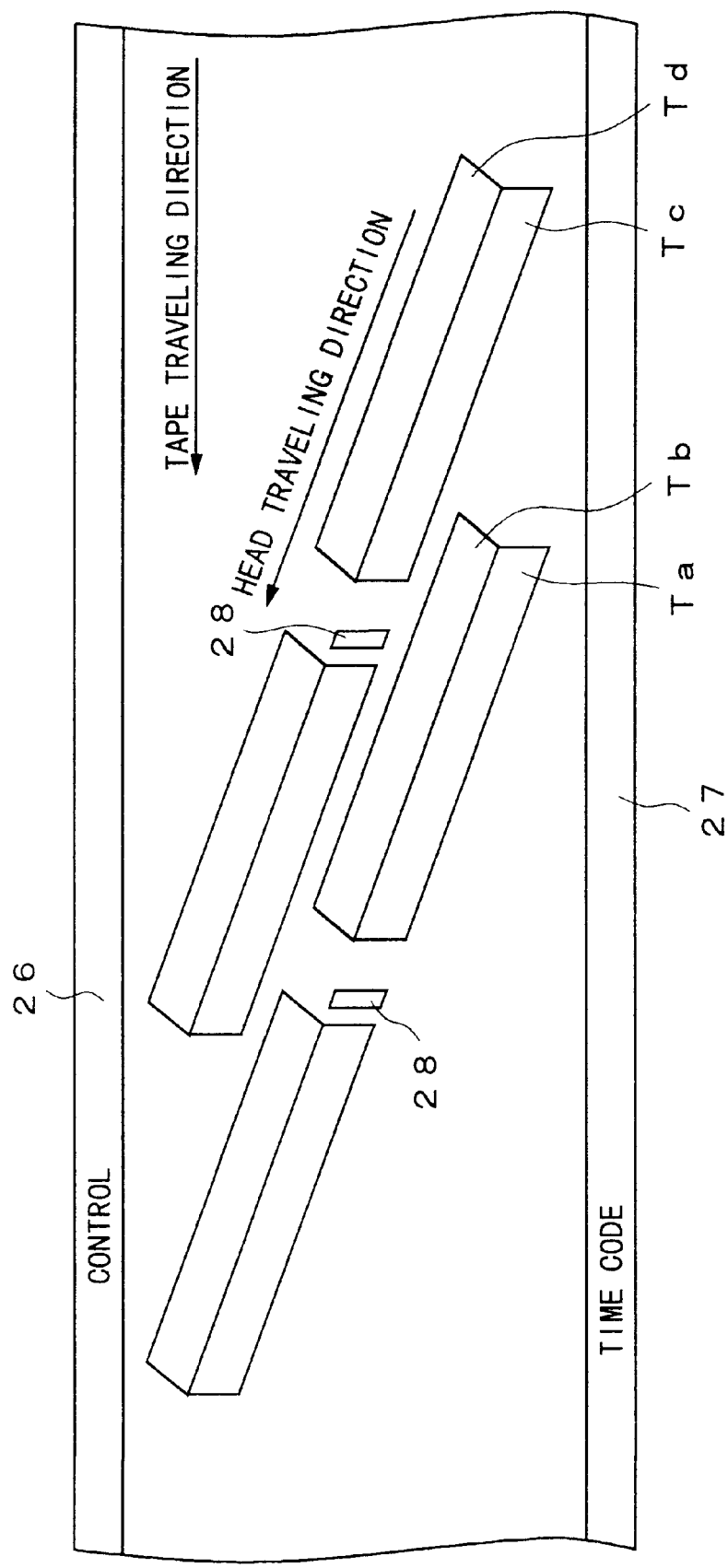
FIG. 5 is a schematic diagram showing a track pattern of the data recorder.

FIG. 5 shows a track pattern on the tape of the digital information recorder 2. Upper and lower longitudinal tracks ate formed in the width direction of the tape. Helical tracks are formed between the upper and lower longitudinal tracks. A control signal is recorded on the upper longitudinal track 26. A time code is recorded on the lower longitudinal track 27. The time code represents the longitudinal position of the tape. For example, SMPTE time code is used. With one rotation of the drum 25, the heads Ra and Rb form two helical tracks Ta and Tb at the same time. Thereafter, the heads Rc and Rd form two helical tracks Tc and Td at the same time. The first half portion and the second half portion of each helical track are separately formed. A tracing pilot signal recording area 28 is formed between the first half portion and the second half portion.

The SMPTE time code was developed for a video signal for a VTR or the like. The minimum unit of the SMPTE time code is a frame (1/30 seconds). In the data recorder, a signal is recorded/reproduced with the unit of data that is recorded on the four tracks Ta to Td shown in FIG. 5. A plurality of tracks corresponding to one unit of such data are referred to as a track set. When 16 tracks correspond to one frame of a video signal, with a lower digit (values 0, 1, 2, and 3) than the frame digit of the time code, a time code of which one unit is composed of 16 tracks should be used (the time code is also referred to as ID). In the data recorder, the SMPTE time code is used in such a manner that one track set is composed of four tracks. With a user data area of the SMPTE time code, such a modification can be performed.

Figure 6:
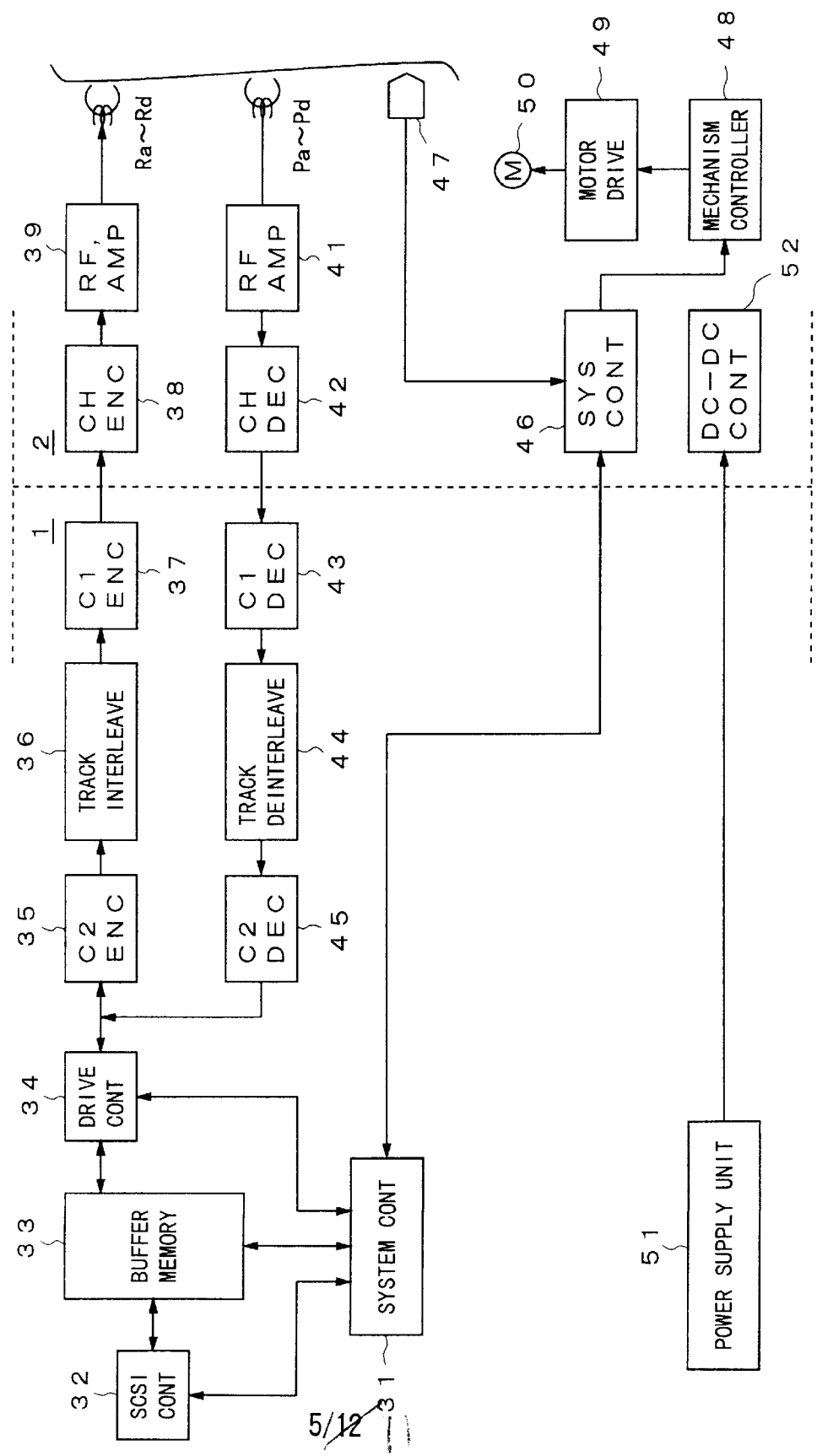
FIG. 6 is a block diagram showing a system structure of the data recorder.

FIG. 6 schematically shows a system structure of the tape drive controller 1 and the digital information recorder 2. The system mainly performs the following:

managing a SCSI controller 32,
managing a buffer memory 33,
managing a file/managing a table,
controlling the write, read, and retry operations of data,
controlling the digital information recorder 2, and
performing the self-diagnosing operation.

The system is connected to the host computer through the SCSI controller 32. A drive controller 34 is disposed between the buffer memory 33 and the tape drive controller. Data read from the buffer memory 33 is supplied to a C2 encoder 35 through the drive controller 34. A track interleaving circuit 36 and a C1 encoder 37 are connected to the C2 encoder 35.

The C2 encoder 35 and the C1 encoder 37 perform an error-correction-code encoding process using a product code for record data. The track interleaving circuit 36 controls the distribution of data recorded on tracks so as to improve the correction performance of an error that takes place in the recording/reproducing processes.

Since data is recorded on the tape in the unit of a sync block separated by a synchronous signal, the track interleaving circuit 36 adds a block synchronous signal to data. The C1 encoder 37 generates a C1 parity, randomizes data, and performs the interleaving process for a word in a plurality of sync blocks.

Digital data is supplied from the C1 encoder 37 to the digital information recorder 2. The digital information recorder 2 pre-codes the digital data received from a channel encoder 38 corresponding to the PR4 method (partial response class 4) (that will be described later). The channel encoder 38 outputs the encoded data to the recording heads Ra to Rd through an RF amplifier 39. The heads Ra to Rd record the data on a magnetic tape 65.

Data reproduced from the magnetic tape 65 by the reproducing heads Pa to Pd is supplied to a channel decoder 42 through an RF amplifier 41. The RF amplifier 41 has a reproducing amplifier, a pre-filter, a cosine equalizer, and so forth. The channel decoder 42 has a PR4 type equalizing circuit and a bit identifying circuit. An output signal of the channel decoder 42 is sent to the tape drive controller 1 and then a C1 decoder 43.

A track deinterleaving circuit 44 is connected to the C1 decoder 43. A C2 decoder 45 is connected to the deinterleaving circuit 44. The C1 decoder 43, the track deinterleaving circuit 44, and the C2 decoder 45 perform the reverse operations of the C1 encoder 37, the track deinterleaving circuit 36, and the C2 encoder 35, respectively. The reproduced (read) data received from the C2 decoder 45 is supplied to the buffer memory 33 through the drive controller 34.

The digital information recorder 2 has a system controller 6. In addition, the digital information recorder 2 has a fixed head 47 for the longitudinal tracks of the magnetic tape 65. The head 47 is connected to the system controller 46. The head 47 records/reproduces the control signal and the time code. The system controller 46 is connected to a system controller 31 of the tape drive controller 1 through a bidirectional bus. When a signal is recorded/reproduced, the system controller 31 detects whether the signal has an uncorrectable error.

A mechanism controller 48 is connected to the system controller 46. The mechanism controller 48 has a servo circuit. The servo circuit drives a motor 50 through a motor driving circuit 49. The system controller 46 has for example two CPUs that control a communication with the tape drive controller 1, perform recording/reproducing operations of the time code, timings of signal recording/reproducing operations, and so forth.

The mechanism controller 48 has for example two CPUs that control a mechanical system of the digital information recorder 2. More practically, the mechanism controller 48 controls the rotations of the head/tape system, the tape speed, the tracking operation, the loading/unloading operation of the cassette tape, and the tape tension. The motor 50 represents a plurality of motors that are a drum motor, a capstan motor, a reel motor, a cassette attaching motor, and a loading motor.

Moreover, the digital information recorder 2 has a DC-DC converting circuit 52 that receives a DC voltage from a power supply unit 51 of the tape drive controller 1. The digital information recorder 2 has a position sensor such as a tape end detecting sensor, a time code generating/reading circuit, and so forth (not shown).

Figure 7:
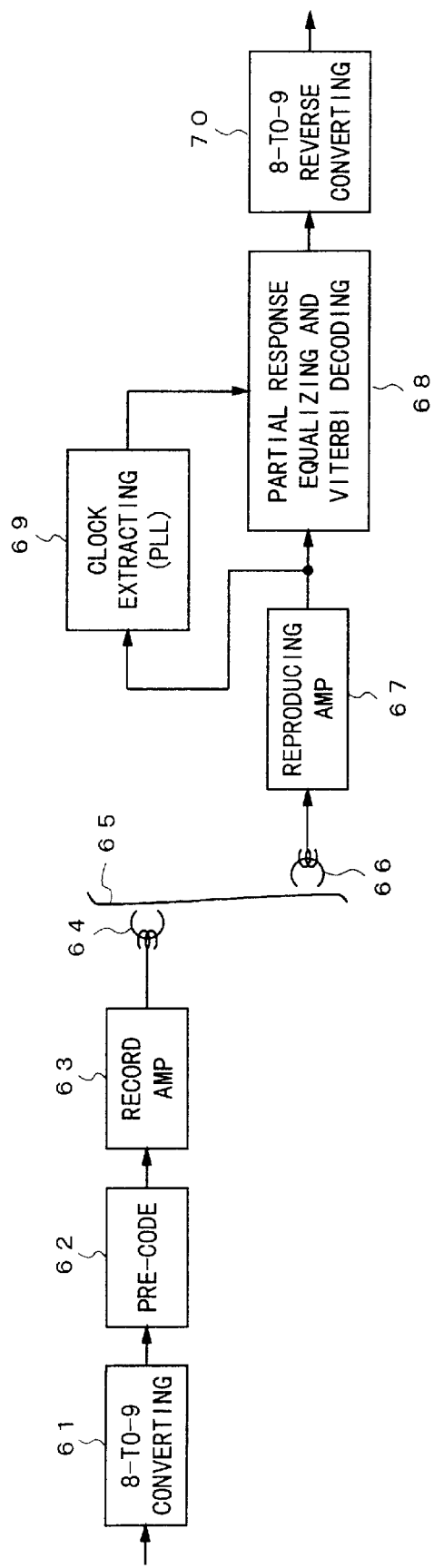
FIG. 7 is a block diagram showing the detail of a digital information recorder.

FIG. 7 is a block diagram showing the detail of the digital information recorder 2 according to the present invention. An 8-to-9 converting circuit 61 and a pre-coding circuit 62 shown in FIG. 7 correspond to the channel encoder 38 shown in FIG. 6. A recording amplifier 63 shown in FIG. 7 corresponds to the RF amplifier 39 shown in FIG. 6. A reproducing amplifier 67 shown in FIG. 7 corresponds to the RF amplifier 41 shown in FIG. 6. A partial response equalizing and Viterbi decoding circuit 68 and an 8-to-9 reverse converting circuit 70 shown in FIG. 7 correspond to the channel decoder 42 shown in FIG. 6. The 8-to-9 converting circuit 61 converts eight-bit-word data into nine-bit-word data so that the reversing intervals of the signal polarity of data that is output from the pre-coding circuit 62 become 5T or less (where T is an interval of data bit) or the DC component of the data that is output from the pre-coding circuit 62 becomes a predetermined value or less.

In the data received from the tape drive controller 1, an error-correction-code encoding process has been performed, a process for enhancing an error correction performance has been performed, or a block synchronous signal has been added. The eight-bit-word data is converted into nine-bit-word data by the 8-to-9 converting circuit 61. The 8-to-9 conversion of the 8-to-9 converting circuit is performed by a ROM (Read Only Memory). Input eight-bit-word data is supplied as an address to the ROM and nine-bit-word data is read therefrom as assigned conversion data. Nine-bit-word data is assigned to eight-bit-word data so that the reversing intervals of the signal polarity of data that is output from the pre-coding circuit 62 become 5T or less or the DC component contained in the data that is output therefrom becomes a value of CDS=|5| or less. The selecting method of the nine-bit-word data assigned to the eight-bit-word data will be described later.

The output data of the 8-to-9 converting circuit 61 is supplied as serial data to the pre-coding circuit 62. The pre-coding circuit 62 pre-codes the input serial data into a code corresponding to the PR4 transmission method. Since the output data of the 8-to-9 converting circuit 61 has been selectively assigned, the code of the pre-coded data is an interleaved NRZI code of which the reversing intervals of the signal polarity are controlled. The pre-coded data is recorded on the magnetic tape 65 through the recording amplifier 63 and a rotating recording head 64. In such a manner, regardless of the value of the input data of the digital information recorder 2, data of which the reversing intervals of the signal polarity become 5T or less and the absolute value of CDS become 5 or less is recorded on the magnetic tape.

The data recorded on the magnetic tape is reproduced by the rotating reproducing head 66. The reproduced data signal is supplied to the partial response equalizing and Viterbi decoding circuit 68 and a clock extracting circuit 69 through the reproducing amplifier 67. The reproducing amplifier 67 has a prefilter and a cosine equalizer that compensate the phase and frequency characteristic of the reproduced data signal so that the frequency characteristic of the reproduced data signal obtained from the rotating reproducing head 66 satisfies a Nyquist frequency condition.

Figure 16:
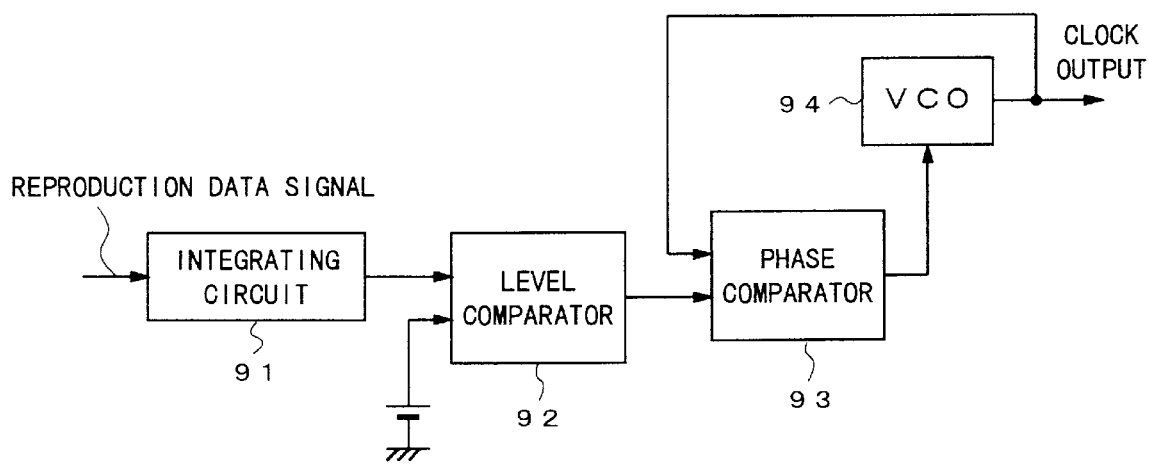
FIG. 16 is a block diagram showing a clock signal extracting circuit.
Figure 15:
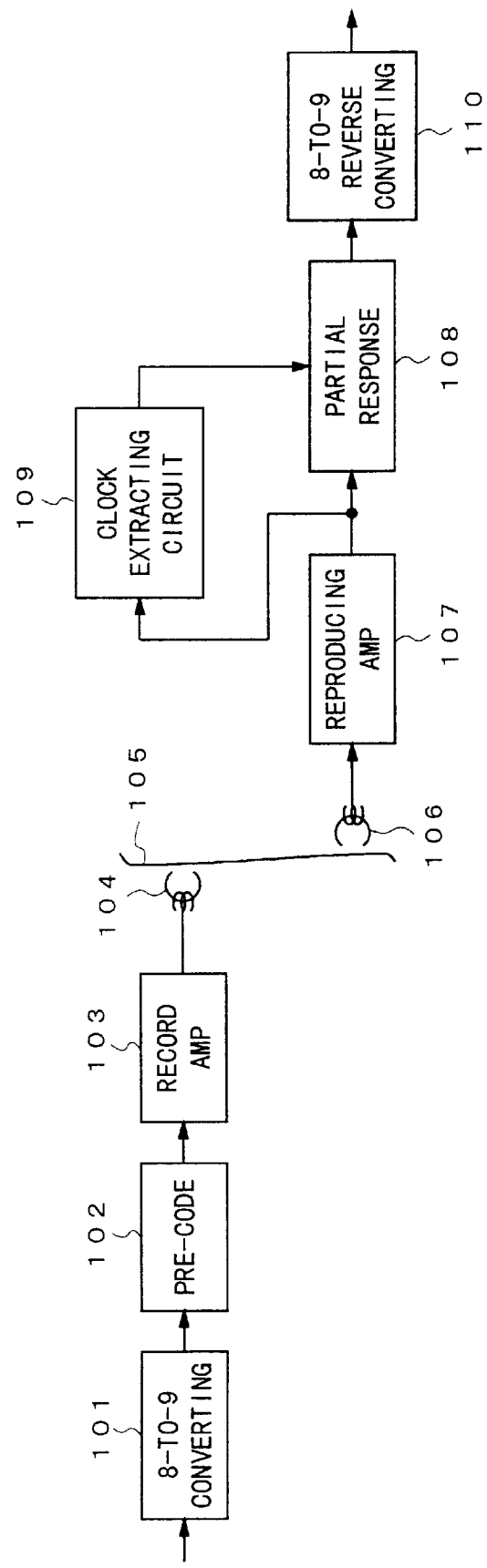
FIG. 15 is a block diagram for explaining a related art.

The structure and operation of the clock extracting circuit 69 are the same as the structure and operation of the clock signal extracting circuit 109 shown in FIG. 16. The clock extracting circuit 69 extracts a clock signal from the reproduced data signal that is output from the reproducing amplifier 67. Since the reversing intervals of the signal polarity of the reproduced data signal are 5T or less, the PLL of the clock extracting circuit 69 is not out of synchronization with the reproduced data signal, but securely extracts the clock signal.

The extracted clock signal is supplied to the partial response equalizing and Viterbi decoding circuit 68. The partial response equalizing and Viterbi decoding circuit 68 equalizes the reproduced data signal corresponding to the PR4 method and identifies bits corresponding to the Viterbi decoding method with the clock signal supplied from the clock extracting circuit 69 so as to restore the reproduced data signal to serial data that has not been pre-coded. Since the clock extracting circuit 69 securely extracts the clock signal from the reproduced data signal of which the reversing intervals of the signal polarity are 5T or less, bits are also accurately identified. Thus, the reliability of the decoded data becomes high.

The restored serial data is supplied to the 8-to-9 reverse converting circuit 70. The 8-to-9 reverse converting circuit 70 reversely converts nine-bit-word data into eight-bit-word data and restores the same data as the input data of the 8-to-9 converting circuit 61. The 8-to-9 reverse conversion is also performed by a ROM. The reverse conversion is performed by supplying input nine-bit-word data as an address to the ROM and by reading eight-bit-word data as conversion data therefrom. The output data of the 8-to-9 reverse converting circuit 70 is supplied to the C1 decoder 43 of the tape drive controller 1 shown in FIG. 6.

As described above, in the embodiment of the present invention, the 8-to-9 converting circuit 61 converts eight-bit-word data into nine-bit-word data so that the reversing intervals of the signal polarity of the data that is output to the pre-coding circuit 62 on the next stage become 5T or less and the DC component of the data becomes a value of CDS=|5| or less. The pre-coding circuit 62 pre-codes the output signal of the 8-to-9 converting circuit 61 and supplies the resultant signal to the recording amplifier 63. The recording amplifier 63 records the data of which the reversing intervals of the signal polarity are 5T or less and the DC component is a value of CDS=|5| or less on the magnetic tape 65 through the rotating recording head 64. The clock extracting circuit 69 of the reproducing system securely extracts the clock signal from the reproduced data signal. The partial response equalizing and Viterbi decoding circuit 68 accurately identifies bits with the extracted clock signal and restores reliable data. In the recording/reproducing/transmitting system, the DC component is reduced. Thus, digital data can be effectively recorded and reproduced on/from the magnetic tape.

Before explaining the selecting method of nine-bit-word data assigned to eight-bit-word data by the 8-to-9 converting circuit 61, the pre-coding circuit 62 will be described. FIG. 8 is a block diagram showing a real structure of the pre-coding circuit 62. The pre-coding circuit 62 is composed of an exclusive-OR circuit 71 and delaying circuit 72 and 73. The delaying circuits 72 and 73 each delay data by one bit. Thus, the pre-coding circuit 62 exclusive-ORs the input data and output data of two bits prior.

FIG. 9 shows bit calculation values of output data against input data by the pre-coding circuit 62. When input data at time $t_0$ to $t_{13}$ is "00111010011010", if output data at time $t_{-2}$ and $t_{-1}$ is "00", output data at time $t_0$ to $t_{13}$ is "00110111100010". Output data at the first time (namely, at time $t_0$) is calculated by exclusive-ORing output data of two bits prior (at time $t_{-2}$) that is "0" and input data at current time to that is "0". Thus, the output data "0" is obtained. Likewise, output data at time $t_n$ is calculated with output data of two bits prior at time $t_{n-2}$ and input data at time $t_n$. Thus, each output data is affected by output data of two bits prior. Consequently, output data against input data at time $t_n$ or later may have four values corresponding to the values of data at time $t_{n-2}$ and $t_{n-1}$.

FIG. 10 is a table showing input data and four codes of output data against output data of two bits prior. When input data is "00111010011010", four codes of output data are present. The left side of the dotted line represents output data of two bits prior.

When output data of two bits prior is "00", output data is "00110111100010".

When output data of two bits prior is "01", output data is "01100010110111".

When output data of two bits prior is "10", output data is "10011101001000".

When output data of two bits prior is "11", output data is "11001000011101".

Figure 11:
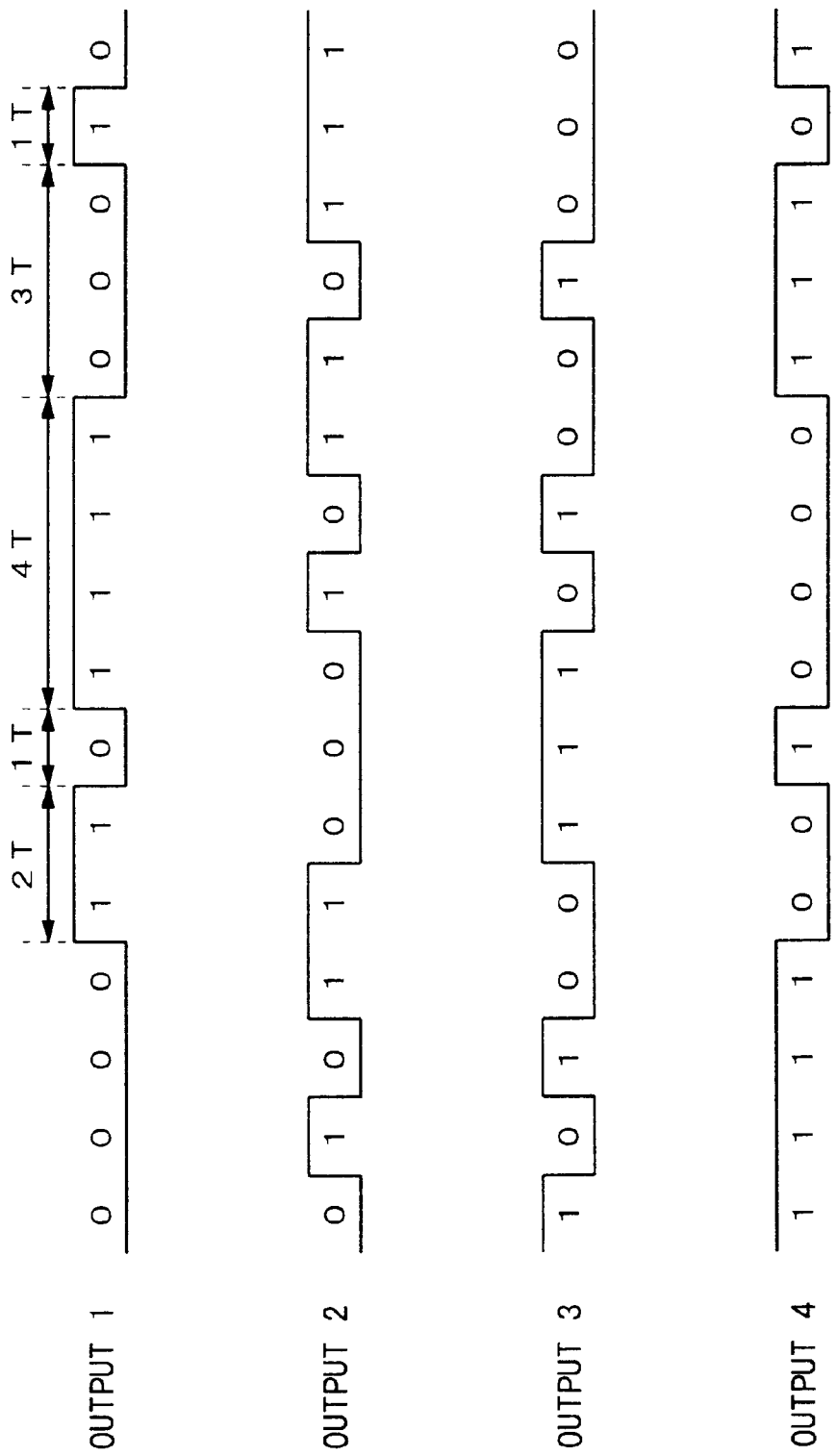
FIG. 11 is a schematic diagram showing waveforms of four codes of output data.

FIG. 11 shows waveforms of output data shown in FIG. 10. Input data shown in FIG. 10 has been selected so that the reversing intervals of the signal polarity of the output signal of the pre-coding circuit become 5T or less. Thus, in the waveforms of the four codes of the output data shown in FIG. 11, the reversing intervals of the signal polarity are 5T or less.

Next, the method for selecting nine-bit-word data assigned to eight-bit-word data by the 8-to-9 converting circuit 61 will be described. In this example, it is assumed that the reversing intervals of the signal polarity of the output signal of the precoding circuit 62 are "5T or less".

The number of codes of nine-bit data is $2^9$=512. From 512 codes, 256 ($2^8$=256) codes of which the reversing intervals of the signal polarity of the output signal of the pre-coding circuit 62 become "5T or less" are selected and assigned to eight-bit-word data considering the characteristic of the pre-coding circuit 62 that represents that "output data at particular time is affected by output data of two bits prior".

(1) First, four codes of output data of the pre-coding circuit 62 for 512 codes of nine-bit-word data are calculated.

FIG. 12 shows the calculated results. For simplicity, the "input" field shown in FIG. 12 only has part of 512 codes of nine-bit-word data. The "pre-code output" field shown in FIG. 12 has four codes as calculated results (a total of 11 bits including prior two bits) corresponding to codes of nine-bit-word data of the "input" field. The left side of the dotted line in the "pre-code output" field represents codes of prior two bits.

(2) Codes of nine-bit-word data of which the same signal polarity of each of four codes of the output data of the pre-coding circuit 62 (namely, four codes in the "pre-code output" field in FIG. 12) exceeds 6T or more are excluded from codes assigned to eight-bit-word data.

Considering the characteristic of the pre-coding circuit 62 of which "output data at particular time is affected by output data of two bits prior" (namely, nine-bit output data against nine-bit input data depends on output data of prior two bits), the number of bits of the pre-coded output data for calculating the reversing intervals of the signal polarity is a total of 11 bits of which nine bits and prior two bits are added. FIG. 13A shows codes of which the same signal polarity successively lasts for 6T or more. In FIG. 13A, X represents "1" or "0".

(3) Codes of nine-bit-word data of which the same signal polarity of adjacent two of four codes of the output data of the pre-coding circuit (namely, the four codes in the "pre-code output" field shown in FIG. 12) successively lasts for 6T or more are excluded from codes assigned to eight-bit-word data.

FIG. 13B shows codes of which the same signal polarity of adjacent two codes of the output data of the pre-coding circuit 62 successively lasts for 6T or more. In FIG. 13B, a pair of codes are shown on both left and right sides. When the lower code and the upper code of each pair are connected, the same signal polarity successively lasts for 7T. In FIG. 13B, X represents "1" or "0".

When codes as shown in FIG. 13B are excluded, the length of the same signal polarity of the right-side code connected to the joint portion of the output data of the pre-coding circuit 62 (the joint portion is denoted by the dotted line of the "pre-code output" field shown in FIG. 12) is 3T or less. In addition, the length of the same signal polarity of the left-side code connected to the joint portion is 2T or less. Thus, the length of the same signal polarity at the joint portion of the pre-coded output data of the remaining nine-bit-word data is 5T or less.

In the above-described process, 293 codes of nine-bit-word data of which the same signal polarity does not successively last for 6T or more are obtained as output data of the pre-coding circuit 62. 256 of 293 codes of nine-bit-word data are assigned to eight-bit-word data. Thus, the reversing intervals of the signal polarity of output data of the pre-coding circuit 62 become "5T or less".

However, when a signal is magnetically recorded or reproduced, it is difficult to reproduce a DC component. It is known that the DC component in the record signal should be minimized. Thus, according to the present invention, codes of which small DC component is supplied to the output data of the pre-coding circuit 62 are selected from 293 codes of nine-bit-word data of which the same signal polarity does not successively last for 6T or more and then assigned to eight-bit-word data.

Figure 14:
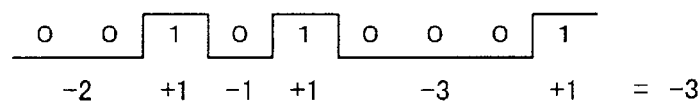
FIG. 14 is a schematic diagram showing a method for obtaining a DC component of data.

Generally, the DC component of an n-bit code is calculated by weighting "+1" to value "1" of each bit and "−1" to value "0" of each bit and summing the weighted values. The calculated result is referred to as CDS (Code-word Digital Sum). For example, the CDS of nine-bit code "001010001" as shown in FIG. 14 is calculated by successively adding the weight of each bit as follows.

$$(-2)+(+1)+(-1)+(+1)+(-3)+(+1)=-3$$

In such a manner, the CDS of each of four codes of "pre-coded output data" of each of 293 codes of nine-bit-word data is calculated. However, the CDS is calculated with nine-bit codes of output data against input data of "pre-coded output". In this calculation, the prior two bits are not included. Codes of the nine-bit-word data of which the DCS exceeds a predetermined value are excluded from codes assigned to eight-bit-word data.

In reality, codes of nine-bit-word data of which the following CDS of data that is output to the pre-coding circuit 62 takes place are excluded from codes assigned to eight-bit-word data.

(1) Output data of at least one of four codes is (+7) or (−7).
(2) Output data of at least one of four codes is (+5) or (−5). Output data of the other codes is (+3) or more or (−3) or less.

When codes of nine-bit-word data that meet the above-described conditions (1) and (2) are excluded, 267 codes of nine-bit-word data of which the absolute value of the CDS that is output to the pre-coding circuit 62 is 5 or less are obtained. 256 codes are selected from the 267 codes and assigned to eight-bit-word data. Thus, the pre-coding circuit 62 outputs data of which the reversing intervals of the signal polarity become "5T or less" and the DC component becomes a predetermined value or less.

According to the present invention, since the reversing intervals of the signal polarity of the pre-coded data in the partial response transmitting system are a predetermined value or less, an input signal of which for example "0, s" succeed can be easily transmitted and reproduced. In addition, the clock signal can be securely extracted. Thus, the PLL operation can be performed at high speed. Moreover, bits of a transmitted signal can be accurately identified. Furthermore, since the DC component of pre-coded data becomes small, the present invention can be effectively applied for a magnetic recording/reproducing system.

I claim:

1. A digital data transmitting apparatus for transmitting digital data corresponding to a partial response method, the apparatus comprising:
   data converting means for converting input data of which one word is composed of m bits (where m is an integer) into conversion data of which one word is composed of n bits (where n is an integer that satisfies the relation of n>m) so that when the conversion data is pre-coded corresponding to the partial response method, reversing intervals of the signal polarity of the conversion data become a predetermined value or less, wherein said conversion data is selected according to the following protocol:
   (1) the number of bits of said input data to be evaluated for selecting said conversion data includes said n bit word, and α bits from a prior word as the higher order bits of said input data;
   (2) any input data to be evaluated that results in the same signal polarity for said conversion data of a predetermined number of bits or greater is excluded; and
   (3) any code to be evaluated that results in the same signal polarity for consecutive bits between consecutive conversion data of a predetermined number of bits or greater is excluded;
   pre-coding means for pre-coding the conversion data corresponding to the partial response method; and
   transmitting means for transmitting an output of said pre-coding means to a receiving side.

2. The digital data transmitting apparatus as set forth in claim 1, wherein said data converting means is adapted for outputting the conversion data so that when the conversion data is pre-coded corresponding to the partial response method, the reversing intervals of the signal polarity of the conversion data become the predetermined value or less and a DC component of the conversion data becomes a predetermined value or less.

3. The digital data transmitting apparatus as set forth in claim 2, wherein the partial response method is a partial response (1, 0, −1) method and wherein said pre-coding means is adapted for pre-coding the conversion data corresponding to the partial response (1, 0, −1) method.

4. The digital data transmitting apparatus as set forth in claim 3, wherein said data converting means is adapted for converting the input data of which one word is composed of eight bits into data of which one word is composed of nine bits and outputting the resultant data as the conversion data.

5. The digital data transmitting apparatus as set forth in claim 4, wherein said data converting means is adapted for outputting conversion data of which one word is composed of nine bits so that when the conversion data is pre-coded corresponding to the partial response (1, 0, −1) method, the reversing intervals of the signal polarity of the conversion data become 5T or less (where T is an interval of a data bit) and the DC component of the conversion data becomes CDS=|5| or less (where CDS is the sum of DC values of data codes).

6. The digital data transmitting apparatus as set forth in claim 2, further comprising:
   clock extracting means for extracting a clock signal from an output of said transmitting means;
   data detecting means for equalizing the output of said transmitting means corresponding to the partial response method and identifying bits of the equalized signal corresponding to the clock signal so as to detect the conversion data of which one word is composed of n bits from the output of said transmitting means; and
   data reverse converting means for converting an output of said data detecting means into the data of which one word is composed of m bits and obtaining the input data.

7. The digital data transmitting apparatus as set forth in claim 1, wherein the partial response method is a partial response (1, 0, −1) method and wherein said pre-coding means is adapted for pre-coding the conversion data corresponding to the partial response (1, 0, −1) method.

8. The digital data transmitting apparatus as set forth in claim 7, wherein said data converting means is adapted for converting the input data of which one word is composed of eight bits into data of which one word is composed of nine bits and outputting the resultant data as the conversion data.

9. The digital data transmitting apparatus as set forth in claim 8, wherein said data converting means is adapted for outputting conversion data of which one word is composed of nine bits so that when the conversion data is pre-coded corresponding to the partial response (1, 0, −1) method, the reversing intervals of the signal polarity of the conversion data become 5T or less (where T is an interval of a data bit).

10. The digital data transmitting apparatus as set forth in claim 1, further comprising:
   clock extracting means for extracting a clock signal from an output of said transmitting means;
   data detecting means for equalizing the output of said transmitting means corresponding to the partial response method and identifying bits of the equalized signal corresponding to the clock signal so as to detect the conversion data of which one word is composed of n bits from the output of said transmitting means; and data reverse converting means for converting an output of said data detecting means into the data of which one word is composed of m bits and obtaining the input data.

11. A digital data transmitting apparatus for transmitting digital data corresponding to a partial response method, the apparatus comprising:

data converting means for converting input data of which one word is composed of m bits (where m is an integer) into conversion data of which one word is composed of n bits (where n is an integer that satisfies the relation of n>m) so that when the conversion data is pre-coded corresponding to the partial response method, the reversing intervals of the signal polarity of the conversion data become a predetermined value or less, wherein said conversion data is selected according to the following protocol:

(1) the number of bits of said input data to be evaluated for selecting said conversion data includes said n bit word, and $\alpha$ bits from a prior word as the higher order bits of said input data;

(2) any input data to be evaluated that results in the same signal polarity for said conversion data of a predetermined number of bits or greater is excluded; and (3) any code to be evaluated that results in the same signal polarity for consecutive bits between consecutive conversion data of a predetermined number of bits or greater is excluded;

pre-coding means for pre-coding the conversion data corresponding to the partial response method; and recording means for recording an output of said pre-coding means to a record medium.

12. The digital data transmitting apparatus as set forth in claim 11, wherein said data converting means is adapted for outputting the conversion data so that when the conversion data is pre-coded corresponding to the partial response method, the reversing intervals of the signal polarity of the conversion data become the predetermined value or less and a DC component of the conversion data becomes a predetermined value or less.

13. The digital data transmitting apparatus as set forth in claim 12, wherein the partial response method is a partial response (1, 0, −1) method and wherein said pre-coding means is adapted for pre-coding the conversion data corresponding to the partial response (1, 0, −1) method.

14. The digital data transmitting apparatus as set forth in claim 13, wherein said data converting means is adapted for converting the input data of which one word is composed of eight bits into data of which one word is composed of nine bits and outputting the resultant data as the conversion data.

15. The digital data transmitting apparatus as set forth in claim 14, wherein said data converting means is adapted for outputting conversion data of which one word is composed of nine bits so that when the conversion data is pre-coded corresponding to the partial response (1, 0, −1) method, the reversing intervals of the signal polarity of the conversion data become 5T or less (where T is an interval of a data bit) and the DC component of the conversion data becomes CDS=|5| or less (where CDS is the sum of DC values of data codes).

16. The digital data transmitting apparatus as set forth in claim 12, further comprising:

reproducing means for reproducing a signal recorded on the record medium;

clock extracting means for extracting a clock signal from an output of said reproducing means;

data detecting means for equalizing the output of said reproducing means corresponding to the partial response method and identifying bits of the equalized signal corresponding to the clock signal so as to detect the conversion data of which one word is composed of n bits from the output of said reproducing means; and data reverse converting means for converting an output of said data detecting means into the data of which one word is composed of m bits and obtaining the input data.

17. The digital data transmitting apparatus as set forth in claim 11, wherein the partial response method is a partial response (1, 0, −1) method and wherein said pre-coding means is adapted for pre-coding the conversion data corresponding to the partial response (1, 0, −1) method.

18. The digital data transmitting apparatus as set forth in claim 17, wherein said data converting means is adapted for converting the input data of which one word is composed of eight bits into data of which one word is composed of nine bits and outputting the resultant data as the conversion data.

19. The digital data transmitting apparatus as set forth in claim 18, wherein said data converting means is adapted for outputting conversion data of which one word is composed of nine bits so that when the conversion data is pre-coded corresponding to the partial response (1, 0, −1) method, the reversing intervals of the signal polarity of the conversion data become 5T or less (where T is an interval of a data bit).

20. The digital data transmitting apparatus as set forth in claim 11, further comprising:

reproducing means for reproducing a signal recorded on the record medium;

clock extracting means for extracting a clock signal from an output of said reproducing means;

data detecting means for equalizing the output of said reproducing means corresponding to the partial response method and identifying bits of the equalized signal corresponding to the clock signal so as to detect the conversion data of which one word is composed of n bits from the output of said reproducing means; and data reverse converting means for converting an output of said data detecting means into the data of which one word is composed of m bits and obtaining the input data.

* * * * *